(12) United States Patent
Cho et al.

(10) Patent No.: US 8,869,071 B2
(45) Date of Patent: Oct. 21, 2014

(54) MOBILE TERMINAL AND METHOD OF CONTROLLING THE OPERATION OF THE MOBILE TERMINAL BASED ON MOVEMENT OF A MAIN BODY

(75) Inventors: Hye Youn Cho, Seoul (KR); Yea Eun Kwon, Seoul (KR); Dong Seok Lee, Seoul (KR)

(73) Assignee: LG Electronics Inc., Seoul (KR)

(*) Notice: Subject to any disclaimer, the term of this patent is extended or adjusted under 35 U.S.C. 154(b) by 1067 days.

(21) Appl. No.: 12/749,427

(22) Filed: Mar. 29, 2010

(65) Prior Publication Data

US 2011/0086673 A1    Apr. 14, 2011

(30) Foreign Application Priority Data

Oct. 9, 2009  (KR) .................. 10-2009-0096340

(51) Int. Cl.
| | |
|---|---|
| G06F 3/033 | (2013.01) |
| G06F 3/00 | (2006.01) |
| G06F 3/048 | (2013.01) |
| G06F 3/14 | (2006.01) |
| G09G 5/00 | (2006.01) |
| H04M 1/725 | (2006.01) |
| G06F 1/16 | (2006.01) |

(52) U.S. Cl.
CPC ...... *H04M 1/72583* (2013.01); *H04M 2250/22* (2013.01); *G06F 1/1694* (2013.01)
USPC ........... 715/863; 715/716; 715/810; 715/858; 715/830; 715/864; 345/157; 345/158; 345/649

(58) Field of Classification Search
USPC ......... 715/810, 830, 863, 864, 784, 716, 858; 245/157, 158, 649; 345/157, 158, 649
See application file for complete search history.

(56) References Cited

U.S. PATENT DOCUMENTS

| | | | |
|---|---|---|---|
| 8,169,448 B2* | 5/2012 | Lee ............................ | 345/619 |
| 2005/0090288 A1* | 4/2005 | Stohr et al. .................. | 455/566 |
| 2006/0017692 A1* | 1/2006 | Wehrenberg et al. ......... | 345/156 |
| 2007/0004451 A1* | 1/2007 | C. Anderson .............. | 455/556.1 |
| 2007/0150830 A1* | 6/2007 | Ording et al. ................ | 715/784 |
| 2007/0156679 A1* | 7/2007 | Kretz et al. ..................... | 707/6 |
| 2008/0146204 A1* | 6/2008 | Gu et al. ..................... | 455/414.1 |
| 2010/0030549 A1* | 2/2010 | Lee et al. ........................ | 704/4 |
| 2010/0075628 A1* | 3/2010 | Ye .............................. | 455/404.2 |
| 2010/0083163 A1* | 4/2010 | Maghoul et al. ............. | 715/781 |
| 2010/0087230 A1* | 4/2010 | Peh et al. ..................... | 455/566 |
| 2010/0222046 A1* | 9/2010 | Cumming ..................... | 455/418 |

* cited by examiner

*Primary Examiner* — Nicholas Ulrich
*Assistant Examiner* — Shangao Zhang
(74) *Attorney, Agent, or Firm* — Lee, Hong, Degerman, Kang & Waimey

(57) ABSTRACT

A mobile terminal and a method of controlling the operation of the mobile terminal are provided. The method includes displaying a first list including one or more items on a display module provided in a main body of the mobile terminal; determining whether the main body has been rotated so as to turn the display module upside down; and if it is determined that the mobile terminal has been rotated so as to turn the display module upside down, displaying a second list, instead of the first list, on the display module. Therefore, it is possible to control various operations performed by the mobile terminal in accordance with the movement of the main body of the mobile terminal.

12 Claims, 13 Drawing Sheets

(a)　　　　　　　　　　(b)

(a)  (b)

(a)  (b)

MOBILE TERMINAL AND METHOD OF CONTROLLING THE OPERATION OF THE MOBILE TERMINAL BASED ON MOVEMENT OF A MAIN BODY

CROSS-REFERENCE TO RELATED APPLICATION

Pursuant to 35 U.S.C. §119(a), this application claims the benefit of earlier filing date and right of priority to Korean Patent Application No. 10-2009-0096340, filed on Oct. 9, 2009, the content of which are hereby incorporated by reference herein in its entirety.

BACKGROUND OF THE INVENTION

1. Field of the Invention

The present invention relates to a mobile terminal and a method of controlling the operation of the mobile terminal, in which various operations performed by the mobile terminal can be effectively controlled in accordance with the movement of the main body of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, various equipment such as a double-sided liquid crystal display (LCD) or a full touch screen is being applied to mobile terminals.

However, there is a restriction in allocating sufficient space for a UI without compromising the mobility and the portability of the mobile terminal even when the mobile terminal is equipped with a full touch screen. Therefore, it is necessary to develop ways to control the operation of a mobile terminal using a new data input method, instead of using an existing complicated menu-based data input method, and thus to efficiently use various functions provided by the mobile terminal.

SUMMARY OF THE INVENTION

The present invention provides a mobile terminal and a method of controlling the operation of the mobile terminal, in which various operations performed by the mobile terminal can be effectively controlled in accordance with the movement of the main body of the mobile terminal.

According to an aspect of the present invention, there is provided a method of controlling the operation of a mobile terminal, the method including a displaying a first list including one or more items on a display module provided in a main body of the mobile terminal; determining whether the main body has been rotated so as to turn the display module upside down; and if it is determined that the mobile terminal has been rotated so as to turn the display module upside down, displaying a second list, instead of the first list, on the display module.

According to another aspect of the present invention, there is provided a mobile terminal including a display module configured to be provided in a main body of the mobile terminal and display a first list including one or more items; a motion sensor configured to sense a motion of the main body; and a controller configured to determine whether the mobile terminal has been rotated so as to turn the display module upside down based on a sensing signal output by the motion sensor, wherein, if it is determined that the mobile terminal has been rotated so as to turn the display module upside down, the controller displays a second list, instead of the first list, on the display module.

According to another aspect of the present invention, there is provided a method of controlling the operation of a mobile terminal, the method including playing a first file and displaying a screen regarding the playing of the first file on a display module provided in a main body of the mobile terminal; determining whether the main body has been rotated so as to turn the display module upside down; and if it is determined that the mobile terminal has been rotated so as to turn the display module upside down, playing a second file, instead of the first file, and displaying a screen regarding the playing of the second file on the display module.

According to another aspect of the present invention, there is provided a mobile terminal including a display module configured to be provided in a main body of the mobile terminal and display a screen regarding the playing of a file; a motion sensor configured to sense a motion of the main body; and a controller configured to play a first file and determine whether the main body has been rotated so as to turn the display module upside down, wherein, if it is determined that the mobile terminal has been rotated so as to turn the display module upside down, the controller plays a second file, instead of the first file, and displays a screen regarding the playing of the second file on the display module.

According to another aspect of the present invention, there is provided a method of controlling the operation of a mobile terminal, the method including displaying a screen corresponding to an operation, selected when the mobile terminal is placed in a first operating mode, on a display module provided in a main body of the mobile terminal; determining whether the main body has been rotated so as to turn the display module upside down; and if it is determined that the mobile terminal has been rotated so as to turn the display module upside down, switching the mobile terminal from the first operating mode to a second operating mode and displaying a screen corresponding to an operation, selected when the mobile terminal is placed in the second operating mode, on the display module.

According to another aspect of the present invention, there is provided a mobile terminal including a display module configured to be provided in a main body of the mobile terminal and display a screen corresponding to an operation, selected when the mobile terminal is placed in a first operating mode; a motion sensor configured to sense a motion of the main body; and a controller configured to determine whether the main body has been rotated so as to turn the display module upside down, wherein, if it is determined that the mobile terminal has been rotated so as to turn the display module upside down, the controller switches the mobile terminal from the first operating mode to a second operating mode and displays a screen corresponding to an operation, selected when the mobile terminal is placed in the second operating mode, on the display module.

According to another aspect of the present invention, there is provided a method of controlling the operation of a mobile terminal, the method including accessing a first website and displaying a webpage screen provided by the first website on a display module provided in a main body of the mobile terminal; determining whether the main body has been rotated so as to turn the display module upside down; and if it is determined that the mobile terminal has been rotated so as to turn the display module upside down, accessing a second website and displaying a webpage screen provided by the second website on the display module.

According to another aspect of the present invention, there is provided a mobile terminal including a wireless communication unit configured to provide an interface for access to a wireless internet; a display module configured to display a webpage screen provided by a first website; a motion sensor configured to sense a motion of the main body; and a controller configured to determine whether a main body of the mobile terminal has been rotated so as to turn the display module upside down, wherein, if it is determined that the mobile terminal has been rotated so as to turn the display module upside down, the controller accesses a second website using a different search engine from the first website and displays a webpage screen provided by the second website.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
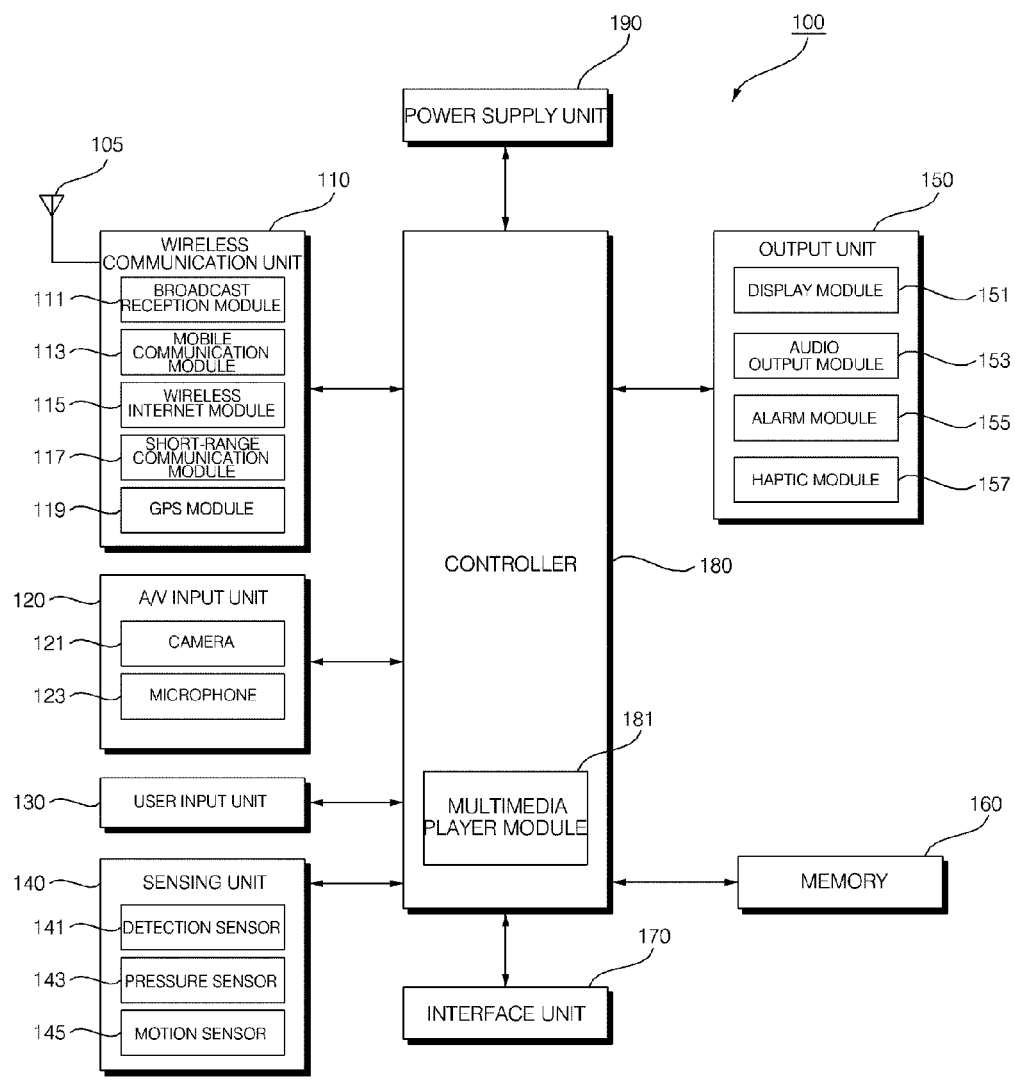
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms.

The broadcast reception module 111 may receive the broadcast signal using various broadcasting systems. In addition, the broadcast reception module 111 may be configured to be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may receive a command or information by being pushed or touched by the user. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a bar-type mobile terminal equipped with a touch screen. However, the present invention is not restricted to a bar-type mobile terminal. Rather, the present invention can be applied to various mobile phones, other than a bar-type mobile terminal.

Figure 2:
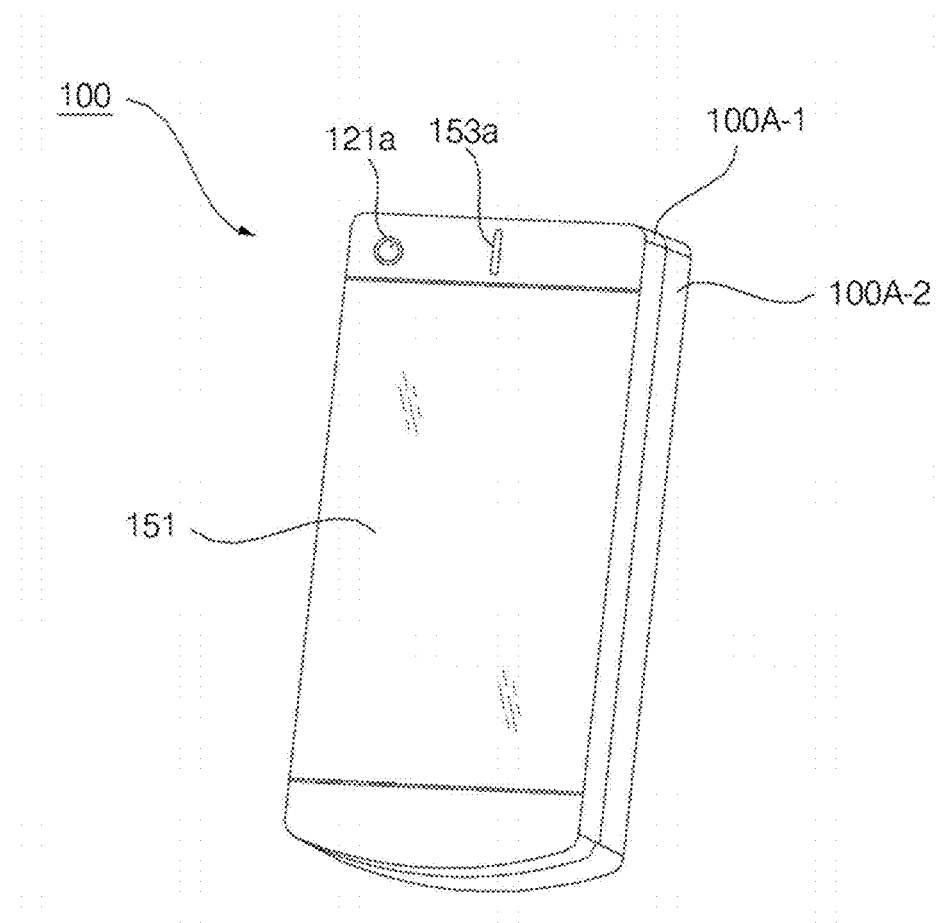
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the mobile terminal 100 may be defined by a front case 100A-1 and a rear case 100A-2. Various electronic devices may be installed in the space formed by the front case 100A-1 and the rear case 100A-2.

The display module 151, a first audio output module 153a, a first camera 121a and a first user input unit 130a may be disposed in the front case 100A-1.

Since a touch pad is configured to overlap the display module 151 and thus to form a layer structure, the display module 151 may serve as a touch screen. Thus, it is possible for the user to input various information to the mobile terminal 100 simply by touching the display module 151.

The user input unit (not shown) may adopt various manipulation methods as long as it can offer tactile feedback to the user.

The user input unit may allow the user to input various commands such as 'start', 'end', and 'scroll,' and various numerals, characters or symbols to the mobile terminal 100. The user input unit 130 may also provide a number of hot keys for activating certain functions of the mobile terminal 100.

The microphone (not shown) may be configured to be able to receive the voice of the user or other sounds.

Figure 3:
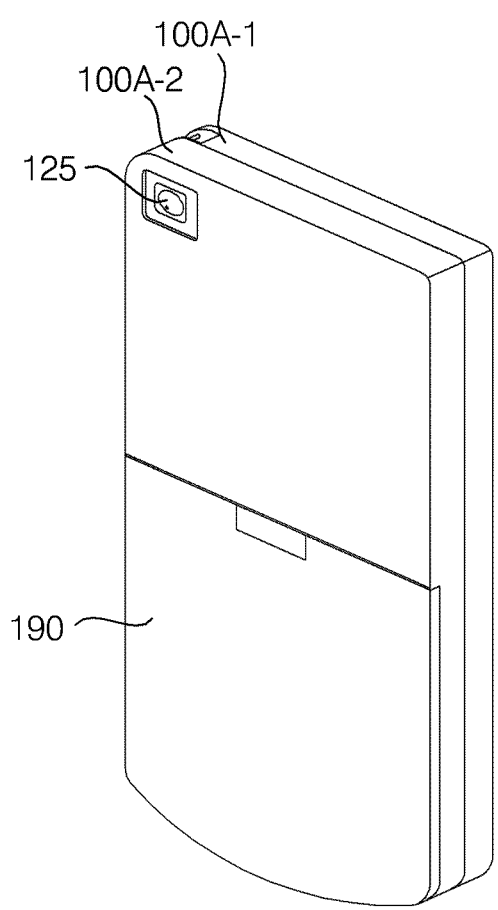
FIG. 3 illustrates a rear perspective view of the mobile terminal shown in FIG. 2.

FIG. 3 illustrates a rear perspective view of the mobile terminal 100 shown in FIG. 2. Referring to FIG. 3, the second camera 125 may be disposed at the rear of the rear case 100A-2, and another user input unit (not shown) may be disposed in the rear case 100A-2.

The second camera 125 may have a different photographing direction from that of the first camera 121a shown in FIG. 2. In addition, the first and second cameras 121a and 125 may have different resolutions. For example, the first camera 121a may be used to capture and then transmit an image of the face of the user during a video call. Thus, a low-resolution camera may be used as the first camera 121a. The second camera 125 may be used to capture an image of an ordinary subject. In this case, the image captured by the second camera 125 may not need to be transmitted. Thus, a high-resolution camera may be used as the second camera 125.

A camera flash (not shown) and a mirror (not shown) may be disposed near the second camera 125. The camera flash may be used to illuminate a subject when the user attempts to capture an image of the subject with the second camera 125. The mirror may be used for the user to prepare him- or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for receiving a broadcast signal may be disposed on one side of the rear case 100A-2. The antenna may be installed so as to be able to be pulled out of the rear case 100A-2.

The second camera 125 and the other elements that have been described as being disposed in the rear case 100A-2 may be disposed in the front case 100A-1. In addition, the first camera 121a may be configured to be rotatable and thus to cover the photographing direction of the second camera 125. In this case, the second camera 125 may be optional.

The second camera 121b and the other elements that have been described as being disposed in the rear case 100A-2 may be disposed in the front case 100A-1. In addition, the first camera 121a may be configured to be rotatable and thus to cover the photographing direction of the second camera 121b. In this case, the second camera 121b may be optional.

Figure 4:
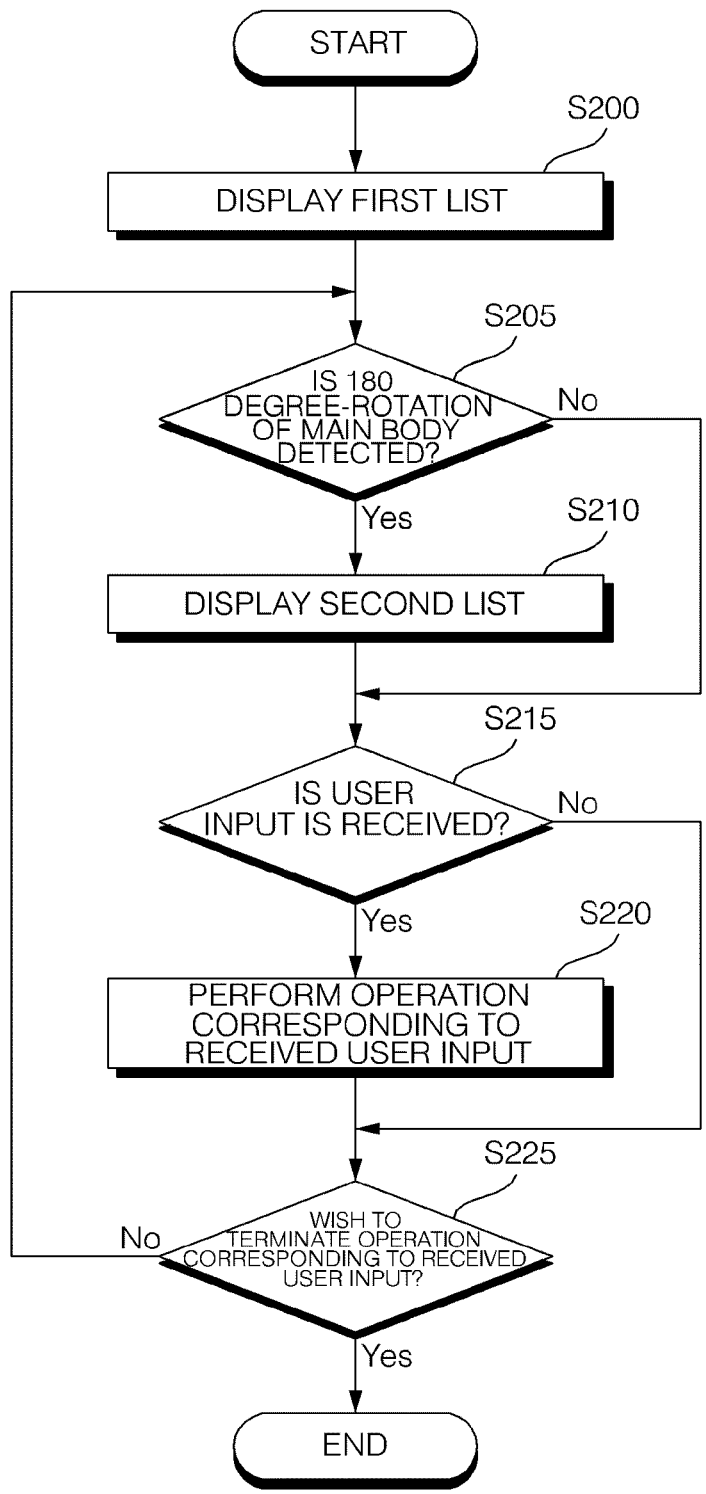
FIG. 4 illustrates a flowchart of a method of controlling the operation of a mobile terminal according to a first exemplary embodiment of the present invention.

FIG. 4 illustrates a flowchart of a method of controlling the operation of a mobile terminal according to a first exemplary embodiment of the present invention. Referring to FIG. 4, if an operating menu such as a phonebook menu, a mail inbox/outbox menu, an MP3 player menu, a moving image-viewer menu, or a still image-viewer menu is selected in response to a user command, the controller 180 may display a first list corresponding to the selected operating menu on the display module 151, e.g., a touch screen (S200).

Thereafter, if sensing data output by the motion sensor 145 indicates that the main body of the mobile terminal 100, which includes the front case 100A-1 and the rear case 100A-2, has been rotated by 180 degrees, and that the display module 151 has been turned upside down (S205), the controller 180 may display a second list, which is different from the first list displayed in operation S200, on the display module 151 (S210).

The second list may be a list obtained by shuffling the first list or a list of a number of items selected by the user. For example, the second list may include the same items as those included in the first list. In this case, the items included in the second list may be arranged in inverse order to that in the first list. Alternatively, the second list may include a number of secret items registered by the user. Still alternatively, if a scrollbar for scrolling the first list is displayed, a list obtained by rearranging the items included in the first list in consideration of the position of the slider in the scrollbar may be displayed as the second list.

Thereafter, if a user input such as a touch input or a key input is received (S215), the controller 180 may control an operation corresponding to the received user input to be performed (S220). Operations S205 through S220 may be repeatedly performed until the user chooses to terminate the operation corresponding to the received user input (S225).

In this manner, when a predetermined list is displayed on the display module 151, it is possible to shuffle the predetermined list or display another list such as a list of a number of secret items registered by the user simply by rotating the main body of the mobile terminal 100 by 180 degrees.

Figure 5:
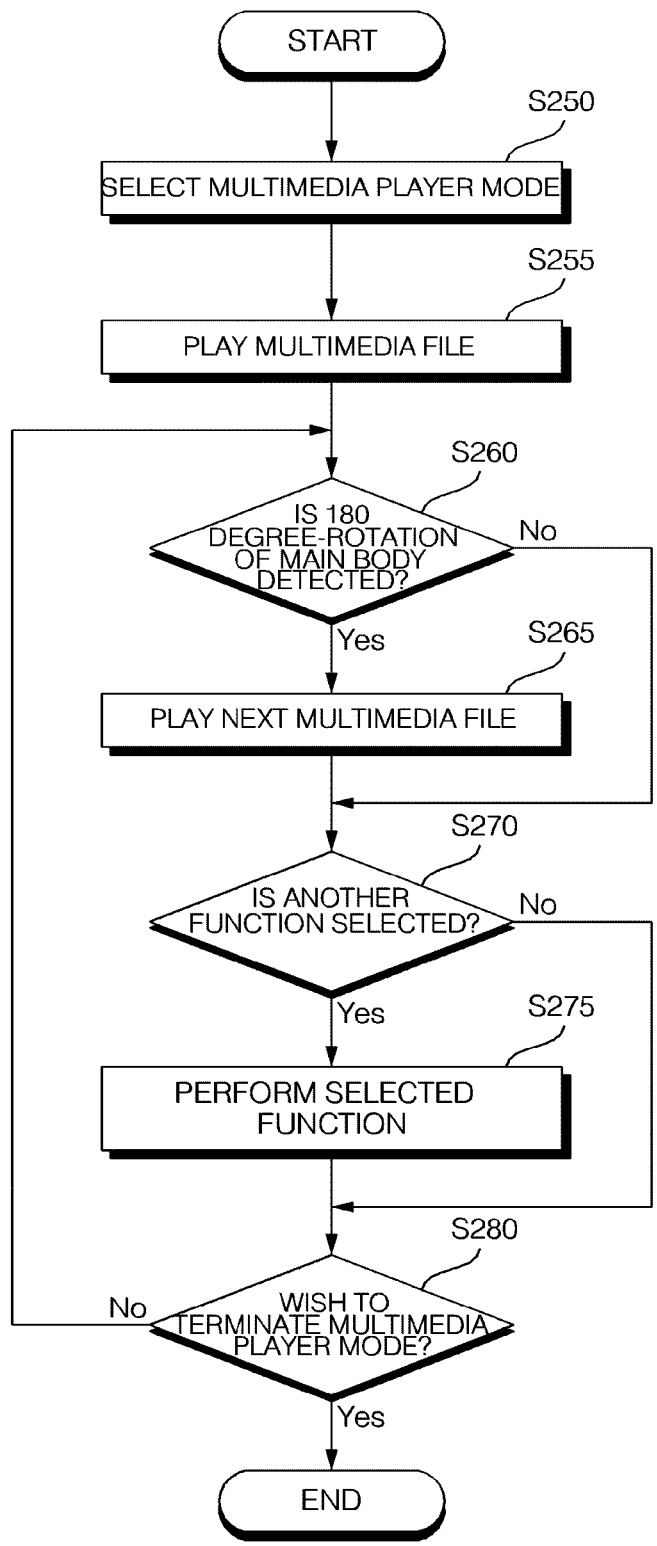
FIG. 5 illustrates a flowchart of a method of controlling the operation of a mobile terminal according to a second exemplary embodiment of the present invention.

FIG. 5 illustrates a flowchart of a method of controlling the operation of a mobile terminal according to a second exemplary embodiment of the present invention. Referring to FIG. 5, if a multimedia player mode for playing a multimedia file such as a music file or a moving-image file is selected in response to a user command (S250), the controller 180 may enter the multimedia mode, and may play a multimedia file selected by the user (S255).

If sensing data output by the motion sensor 145 indicates that the main body of the mobile terminal 100 has been rotated by 180 degrees during the playing of the selected multimedia file, and that the display module 151 has been turned upside down (S260), the controller 180 may play another multimedia file (S265). The multimedia file played in operation S265 may be the next multimedia file to the selected multimedia file, the last multimedia file in the same list as the selected multimedia file, or a multimedia file set in advance to be played upon a 180 degree-rotation of the mobile terminal 100.

If a function other than playing a multimedia file is selected (S270), the controller 180 may control the selected function to be performed (S275). Operations S260 through S275 may be repeatedly performed until the user chooses to terminate the multimedia player mode (S280).

In this manner, during the playing of a multimedia file, it is possible to play another multimedia file (such as the next or the last multimedia file in the list) simply by rotating the main body of the mobile terminal 100 by 180 degrees.

Figure 6:
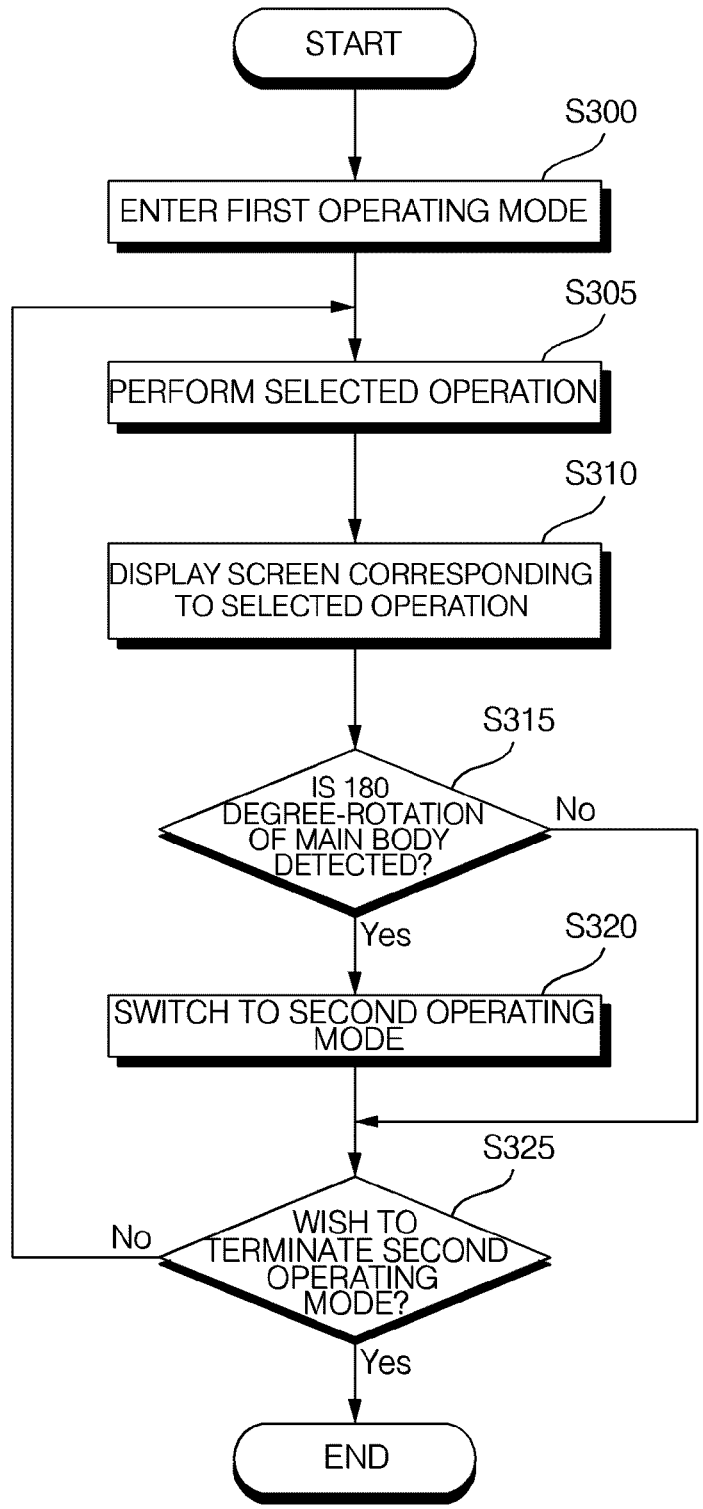
FIG. 6 illustrates a flowchart of a method of controlling the operation of a mobile terminal according to a third exemplary embodiment of the present invention.

FIG. 6 illustrates a flowchart of a method of controlling the operation of a mobile terminal according to a third exemplary embodiment of the present invention. Referring to FIG. 6, the controller 180 may enter a first operating mode in response to a user command (S300), and may perform an operation selected by the user (S305). Thereafter, the controller 180 may display a screen corresponding to the selected operation on the display module 151 (S310). The screen displayed in operation S310 may be a screen showing how the selected operation progresses, a screen showing the results of the selected operation or a menu screen corresponding to the selected operation.

Operations S305 and S310 may be repeatedly performed until a rotation of the main body of the mobile terminal 100 is detected.

If sensing data output by the motion sensor 145 indicates that the main body of the mobile terminal 100 has been rotated by 180 degrees, and that the display module 151 has been turned upside down (S315), the controller 180 may switch to a second operating mode, which is different from the first operating mode (S320).

The second operating mode may be an operating mode set in advance to be entered upon a rotation of the mobile terminal 100 or an operating mode associated with the first operating mode. For example, the first operating mode may be an ordinary operating mode, and the second operating mode may be a theater mode. Alternatively, the first operating mode is a home operating mode, and the second operating mode may be an office operating mode.

Operations S305 through S320 may be repeatedly performed until the user chooses to terminate the second operating mode (S325). In this manner, it is possible to easily switch from one operating mode to another operating mode simply by rotating the main body of the mobile terminal 100 by 180 degrees.

Figure 7:
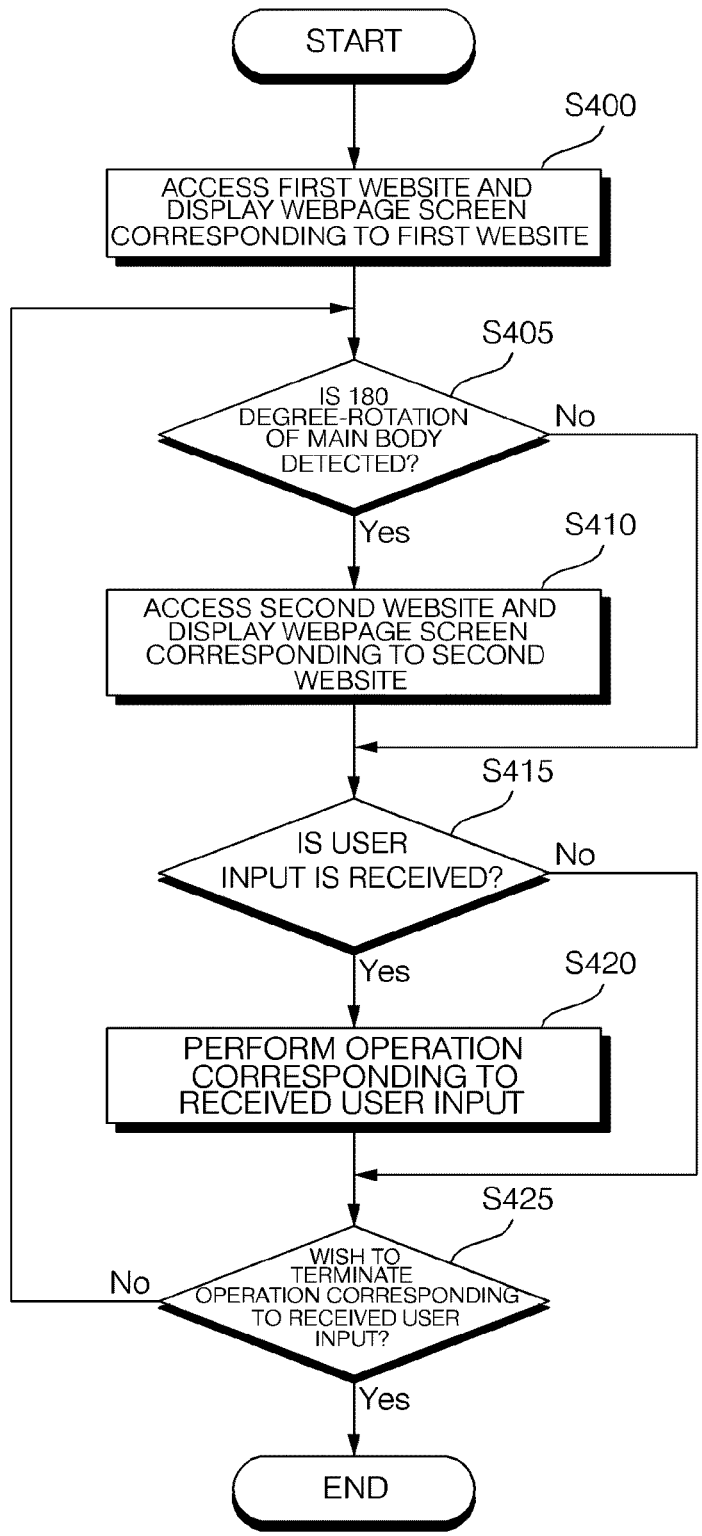
FIG. 7 illustrates a flowchart of a method of controlling the operation of a mobile terminal according to a fourth exemplary embodiment of the present invention.

FIG. 7 illustrates a flowchart of a method of controlling the operation of a mobile terminal according to a fourth exemplary embodiment of the present invention. Referring to FIG. 7, the controller 180 may execute a web browser in response to a user command, may access a first website with the aid of the wireless internet module 115, and may display a webpage provided by the first website on the display module 151 (S400).

Thereafter, if sensing data output by the motion sensor 145 indicates that the main body of the mobile terminal 100 has been rotated by 180 degrees, and that the display module 151 has been turned upside down (S405), the controller 180 may access a second website, and may display a webpage provided by the second website (S410).

The second website may be a website using a different search engine from that used by the first website. That is, the controller 180 may display a webpage provided by a website using a different search engine from that used by the first website upon a 180 degree-rotation of the mobile terminal 100.

Thereafter, if a user input such as an input keyword is received (S415), the controller 180 may perform an operation corresponding to the received user input such as displaying search results corresponding to the input search word (S420).

For example, the user may input a predetermined keyword when a webpage screen corresponding to the first website is displayed on the display module 151, and may perform a search at the second website. Then, the results of the search may be displayed on the display module 151.

Operations S405 through S420 may be repeatedly performed until the user chooses to terminate the operation corresponding to the received user input.

In this manner, it is possible to navigate from one webpage to another webpage simply by rotating the main body of the mobile terminal 100 by 180 degrees.

FIGS. 8 through 13 illustrate diagrams for explaining the first through fourth exemplary embodiments.

Figure 8:
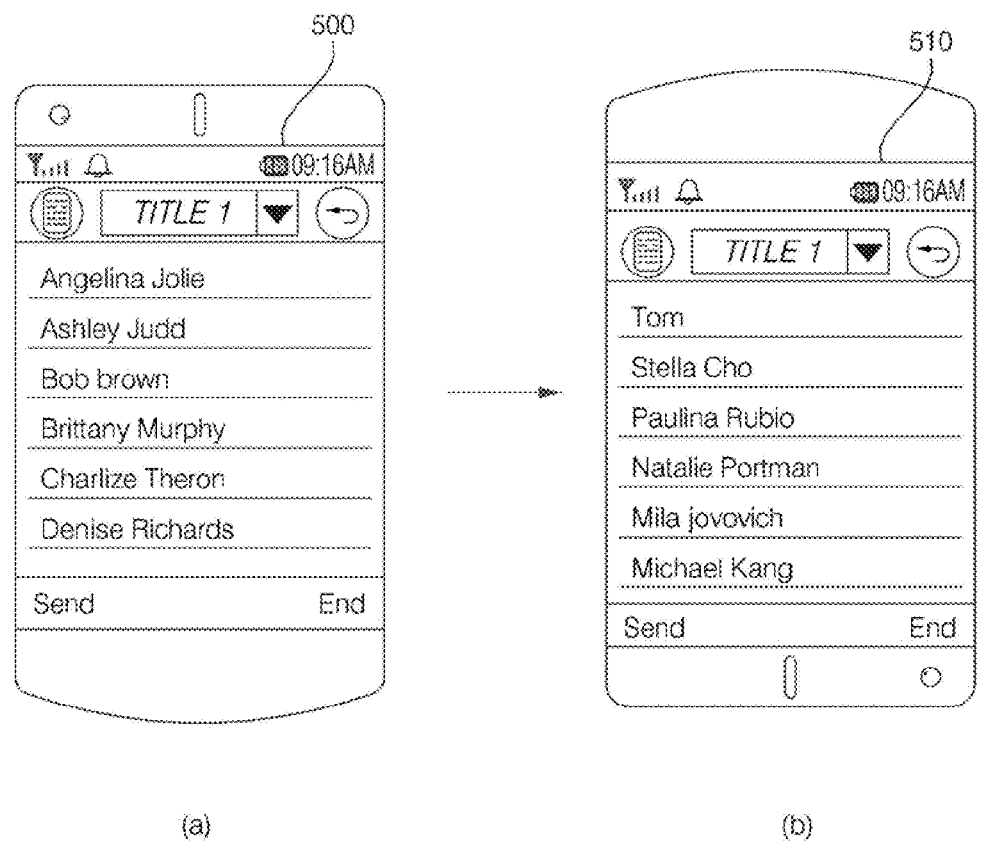
FIGS. 8 through 13 illustrate diagrams for explaining the methods shown in FIGS. 4 through 7.
Figure 9:
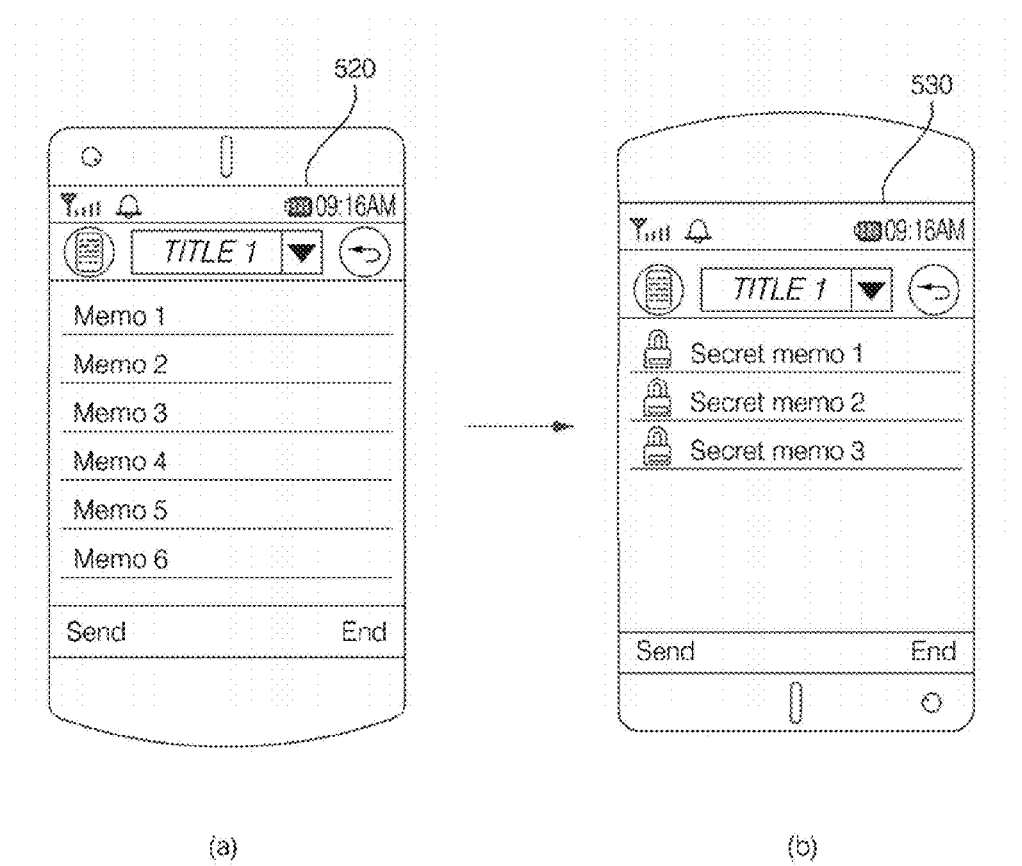
Figure 10:
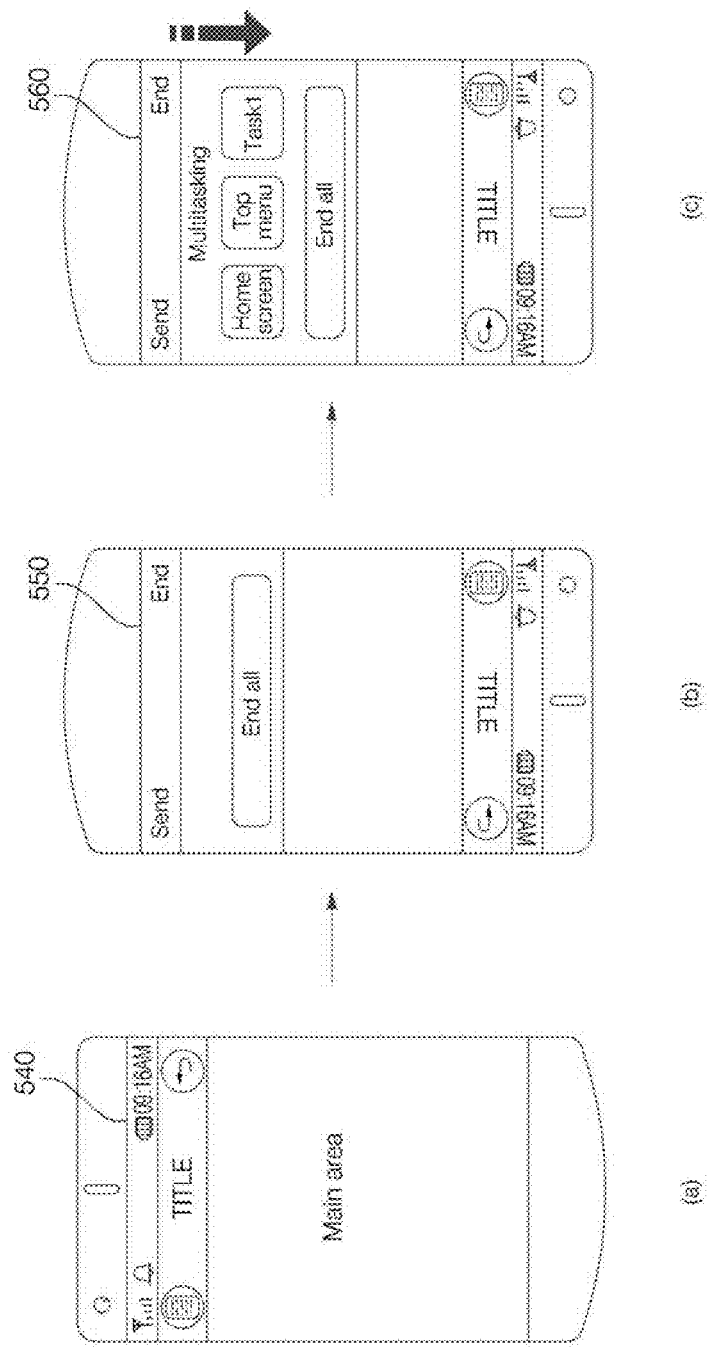

More specifically, FIGS. 8 through 10 illustrate diagrams for explaining the first exemplary embodiment.

Referring to FIGS. 8(*a*) and 8(*b*), if the main body of the mobile terminal 100 is rotated by 180 degrees and thus the display module 151 is turned upside down when a screen 500 including a first list including a plurality of items is displayed on the display module 151, a screen 510 including a second list, i.e., a list obtained by rearranging the plurality of items in the first list in inverse order to that in the first list, may be displayed.

Referring to FIGS. 9(*a*) and 9(*b*), if the main body of the mobile terminal 100 is rotated by 180 degrees and thus the display module 151 is turned upside down when a screen 520 including a list of a plurality of memos is displayed on the display module 151, a screen 530 including a list of a plurality of secret memos may be displayed.

Referring to FIGS. 10(*a*) through 10(*c*), if the main body of the mobile terminal 100 is rotated by 180 degrees and thus the display module 151 is turned upside down when a screen 540 corresponding to a predetermined operating mode is displayed on the display module 151, a screen 550 or 560 showing a multitasking window sliding out from the top of the screen 550 or 560 may be displayed.

Figure 11:
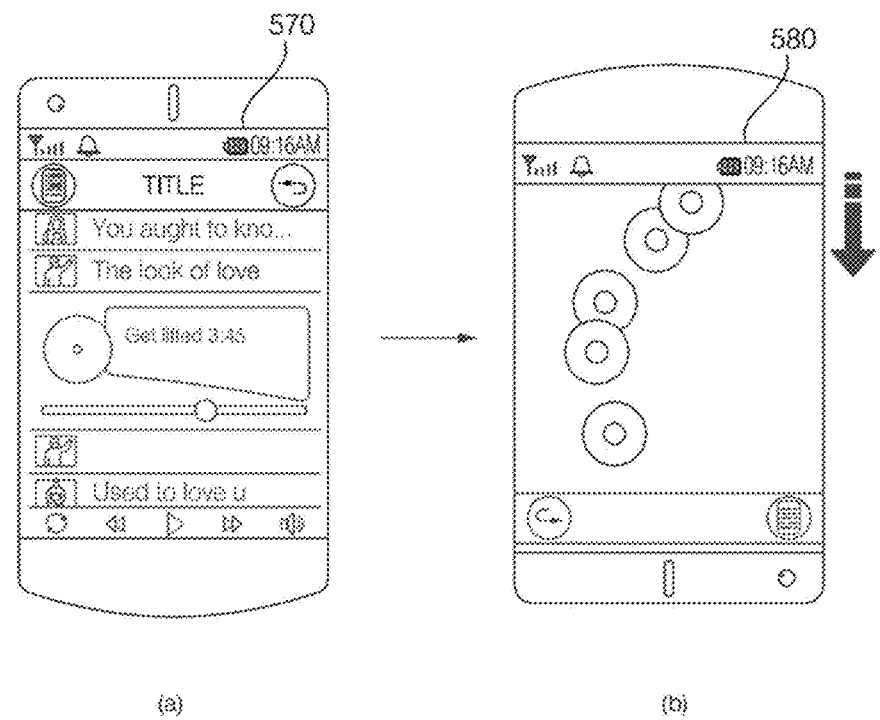

FIG. 11 illustrates diagrams for explaining the second exemplary embodiment. Referring to FIGS. 11(*a*) and 11(*b*), if the main body of the mobile terminal 100 is rotated by 180 degrees and thus the display module 151 is turned upside down when a screen 570 showing that a predetermined file is being played in a multimedia player mode, the last file in the playlist where the predetermined file belongs may be played, and a screen 580 showing a plurality of icons respectively representing a plurality of multimedia files in the playlist where the predetermined file belongs may be displayed. Each of the plurality of icons may be rendered on the screen 580 as falling from the top of the screen 580 in inverse order to that of the plurality of multimedia files in the playlist where the predetermined multimedia file belongs.

Figure 12:
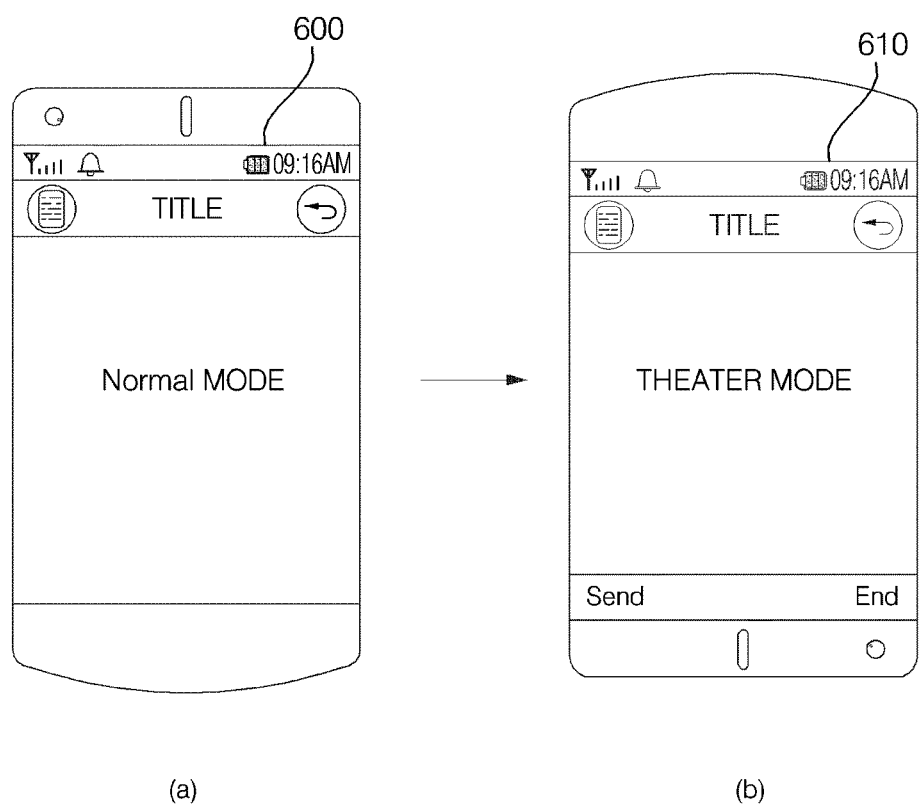

FIG. 12 illustrates diagrams for explaining the third exemplary embodiment. Referring to FIGS. 12(*a*) and 12(*b*), if the main body of the mobile terminal 100 is rotated by 180 degrees and thus the display module 151 is turned upside down when the mobile terminal 100 operates in an ordinary operating mode and thus a screen 600 corresponding to the ordinary operating mode is displayed on the display module 151, the mobile terminal 100 may be switched to a theater mode in which an incoming call or message is alerted to the user using vibration or a silent manner, and a screen 610 corresponding to the theater mode may be displayed.

Figure 13:
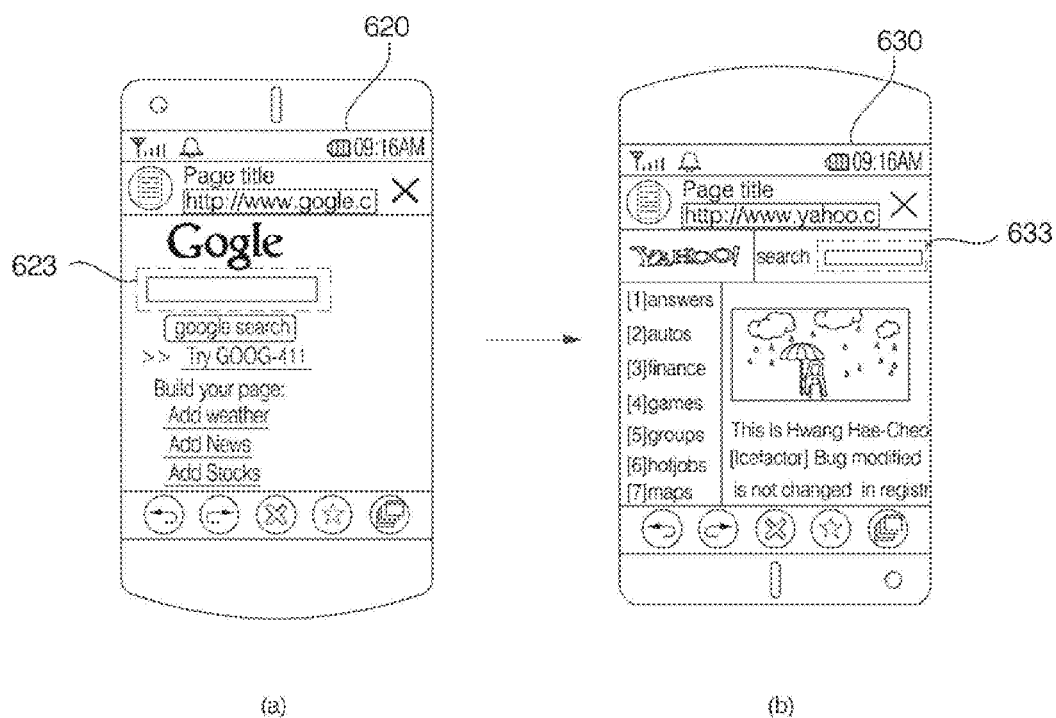

FIG. 13 illustrates diagrams for explaining the fourth exemplary embodiment. Referring to FIGS. 13(*a*) and 13(*b*), if the main body of the mobile terminal 100 is rotated by 180 degrees and thus the display module 151 is turned upside down when a webpage screen 620 including a search window 623 is displayed on the display module 151, a webpage screen 630 using a different search engine from that used by the webpage screen 620 may be displayed. In this case, if there is a keyword input into the search window 623, the input keyword may be automatically input into a search window 633 on the webpage screen 630, and thus, a search may be conducted on the webpage screen 630.

In short, according to the first through fourth exemplary embodiments, it is possible to shuffle a list currently being displayed on the display module 151, display another list, switch from one operating mode to another operating mode, or switch from one search engine to another search engine simply by rotating the main body of the mobile terminal 100 by 180 degrees.

The mobile terminal according to the present invention and the method of controlling the operation of a mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to control various operations performed by a mobile terminal (such as shuffling a list currently being displayed, displaying another list, switching from one operating mode to another operating mode, or switching from one search engine to another search engine) simply by rotating the main body of the mobile terminal so as to turn a display module of the mobile terminal upside down. That is, it is possible to control the operation of a mobile terminal with ease by moving the mobile terminal, instead of navigating through a complicated menu system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling operation of a mobile terminal, the method comprising:
   displaying a first list including one or more items on a display module of a main body of the mobile terminal;
   determining whether the main body has been rotated by a predetermined degree such that the display module is turned upside down; and
   no longer displaying the first list on the display module if it is determined that the mobile terminal has been rotated by the predetermined degree and displaying a second list on the display module, the second list related to the first list and determined in advance according to a user selection command,
   wherein the second list is a list including a number of secret items registered by a user, a list obtained by rearranging the one or more items previously displayed in the first list such that the one or more items are displayed in inverse order of an order of the one or more items in the previously displayed first list or a list obtained by rearranging the one or more items in the previously displayed first list according to a current position of a scrollbar.

2. The method of claim 1, wherein the predetermined degree is 180 degrees.

3. The method of claim 1, further comprising detecting a movement of the main body based on a variation in a sensing signal output by a motion sensor.

4. A mobile terminal comprising:
   a display module in a main body of the mobile terminal, the display module configured to display information;
   a motion sensor configured to sense a motion of the main body; and
   a controller configured to:
   control the display module to display a first list including one or more items;
   determine whether the mobile terminal has been rotated by a predetermined degree such that the display module is turned upside down, the determination based on a sensing signal output by the motion sensor; and
   control the display module to no longer display the first list if it is determined that the mobile terminal has been rotated by the predetermined degree and control the display module to display a second list, the second list related to the first list and determined in advance according to a user selection command,
   wherein the second list is a list including a number of secret items registered in advance by a user, a list obtained by rearranging the one or more items previously displayed in the first list such that the one or more items are displayed in inverse order of an order of the one or more items in the previously displayed first list or a list obtained by rearranging the items in the previously displayed first list according to a current position of a scrollbar.

5. A method of controlling the operation of a mobile terminal, the method comprising:
   playing a first file that belongs to a playlist and displaying a first screen related to playing the first file on a display module of a main body of the mobile terminal;
   determining whether the main body has been rotated by a predetermined degree such that the display module is turned upside down; and
   no longer playing the first file and no longer displaying the first screen if it is determined that the mobile terminal has been rotated by the predetermined degree and playing a second file that belongs to the playlist and displaying a second screen related to playing the second file on the display module, the second file last in the playlist,
   wherein the second screen comprises a plurality of icons each representing one of a plurality of multimedia files in the playlist, the plurality of icons displayed on the second screen as falling in a downward direction from a top of the second screen in reverse order of an order of the plurality of multimedia files in the playlist.

6. The method of claim 5, wherein the second file is next to the first file in the playlist.

7. The method of claim 5, wherein the predetermined degree is 180 degrees.

8. A mobile terminal comprising:
   a display module in a main body of the mobile terminal, the display module configured to display information;
   a motion sensor configured to sense a motion of the main body; and
   a controller configured to:
   play a first file that belongs to a playlist and control the display module to display a first screen related to playing the first file;
   determine whether the main body has been rotated by a predetermined degree such that the display module is turned upside down; and
   no longer play the first file and control the display module to no longer display the first screen if it is determined that the mobile terminal has been rotated by the predetermined degree and play a second file that belongs to the playlist and control the display module to display a second screen related to playing the second file, the second file last in the playlist,
   wherein the second screen comprises a plurality of icons each representing one of a plurality of multimedia files in the playlist, the plurality of icons displayed on the second screen as falling in a downward direction from a top of the second screen in reverse order of an order of the plurality of multimedia files in the playlist.

9. A method of controlling the operation of a mobile terminal, the method comprising:

accessing a first website and displaying a first webpage screen provided by the first website on a display module in a main body of the mobile terminal;

determining whether the main body has been rotated by a predetermined degree such that the display module is turned upside down;

accessing a second website different from the first website and displaying a second webpage screen provided by the second website on the display module if it is determined that the mobile terminal has been rotated by the predetermined degree, the second website set in advance by a user; and automatically inputting a keyword previously input via the first webpage screen into the second webpage screen upon determining the rotation of the mobile terminal.

10. The method of claim 9, wherein the second website uses a different search engine from the first website.

11. The method of claim 10, further comprising conducting a search at the second website using the keyword input via the first webpage screen.

12. A mobile terminal comprising:

a wireless communication unit configured to provide an interface for access to a wireless Internet;

a display module configured to display a first webpage screen provided by a first website;

a motion sensor configured to sense a motion of a main body of the mobile terminal; and a controller configured to:

determine whether the main body has been rotated by a predetermined degree such that the display module is turned upside down;

access a second website using a different search engine from the first website and display a second webpage screen provided by the second website if it is determined that the mobile terminal has been rotated by the predetermined degree, the second website set in advance by a user, and automatically input a keyword previously input via the first webpage screen into the second webpage screen upon determining the rotation of the mobile terminal.

\* \* \* \* \*